United States Patent [19]

Sinclair et al.

[11] Patent Number: 4,494,566

[45] Date of Patent: Jan. 22, 1985

[54] INDICATOR ASSEMBLY

[75] Inventors: Franklin H. Sinclair, Oradell; Gary Glockner, Hillsdale, both of N.J.

[73] Assignee: Westlock Controls Corporation, Moonachie, N.J.

[21] Appl. No.: 367,038

[22] Filed: Apr. 9, 1982

[51] Int. Cl.³ .............................................. F16K 37/00
[52] U.S. Cl. .................................. 137/556; 116/277; 116/302; 116/303
[58] Field of Search ............... 116/227, 277, 273, 264, 116/271, 302, 303; 137/553, 556, 556.3, 556.6

[56] References Cited

U.S. PATENT DOCUMENTS

| | | | |
|---|---|---|---|
| 2,829,538 | 4/1958 | Mueller | 116/277 |
| 3,148,701 | 9/1964 | Bagwell | 137/556 |
| 3,804,056 | 4/1974 | Lee et al. | 116/277 |
| 3,910,308 | 10/1975 | Mack | 137/553 |
| 4,046,350 | 9/1977 | Massey et al. | 137/556 |
| 4,194,529 | 3/1980 | Hargroves et al. | 116/271 |

*Primary Examiner*—A. Michael Chambers
*Attorney, Agent, or Firm*—Louis E. Marn

[57] ABSTRACT

There is disclosed a novel indicator assembly comprised of a housing member mounted to a fluid handling apparatus and an indicator member mounted for rotation within the housing member operationally associated to a moving member of the fluid handling apparatus wherein the housing member is provided with transparent sectors permitting visual observation of the indicator member and wherein the indicator member is provided with colored sectors to visually cooperate with the transparent sectors of the housing member to indicate operational modes of the fluid handling apparatus.

16 Claims, 4 Drawing Figures

INDICATOR ASSEMBLY

FIELD OF THE INVENTION

This invention relates to an indicator assembly, and more particularly to an indicator assembly for the visual observation of the operational setting of a fluid handling apparatus, such as a valve.

BACKGROUND OF THE INVENTION

Fluid handling apparatus, such as butterfly valves, have been provided with external indicators permitting visual observation of the relative operational positioning of the disk of the valve wherein the rotatable spindle to which disc is mounted is actuated through a driven gear and a driving worm gear mounted on a shaft connected to a handle wheel of the valve assembly. Generally, visual observation of the operational positioning of the spindle of such a valve assembly requires relatively close visual inspection, e.g. 5 to 10 feet, and in particular from that side of the assembly valve on which the driving gear therefor is disposed. Thus, in the event of a disabling condition of the plant in which such valve assembly is included, it would be necessary to require operating personnel to come into close proximity to each such valve assembly to ascertain operational setting thereby possibly exposing such operating personnel to dangerous and hazardous situations.

OBJECTS OF THE INVENTION

An object of the present invention is to provide a novel indicator assembly for fluid handling apparatus to permit instant visual indication of the operational setting thereof.

Another object of the present invention is to provide a novel indicator assembly for fluid handling apparatus to permit instant visual indication of the operational setting thereof from remote distances.

Still another object of the present invention is to provide a novel indicator assembly for fluid handling apparatus to permit instant visual indication of the operational setting thereof from substantially any angle of observation.

A further object of the present invention is to provide a novel indicator assembly for process apparatus to permit instant afar visual indication of the operational setting thereof to reduce operating personnel exposure to potential dangerous and/or hazardous conditions.

A still further object of the present invention is to provide a novel indicator assembly for fluid handling apparatus to permit instant visual indication of the operational setting thereof and comprised of no external moving parts which may be effected by the surrounding environment.

Yet a further object of the present invention is to provide a novel indicator assembly for fluid handling apparatus to permit instant visual indication of the operational setting thereof conveniently retrofitted on such fluid handling apparatus.

SUMMARY OF THE INVENTION

These and other objects of the present invention are achieved by an indicator assembly comprised of a housing member mounted to the fluid handling apparatus and an indicator member mounted for rotation within the housing member operationally associated to a moving member of the fluid handling apparatus wherein the housing member is provided with transparent sectors permitting visual observation of the indicator member and wherein the indicator member is provided with colored sectors to visually cooperate with the transparent sectors of the housing member to indicate operational modes of the fluid handling apparatus, as more fully herein disclosed.

BRIEF DESCRIPTION OF THE DRAWINGS

A better understanding of the present invention as well as other objects and advantages thereof will become apparent upon consideration of the detailed disclosure thereof, especially when taken with the accompanying drawings, wherein.

DETAILED DESCRIPTION OF THE INVENTION

Figure 1:
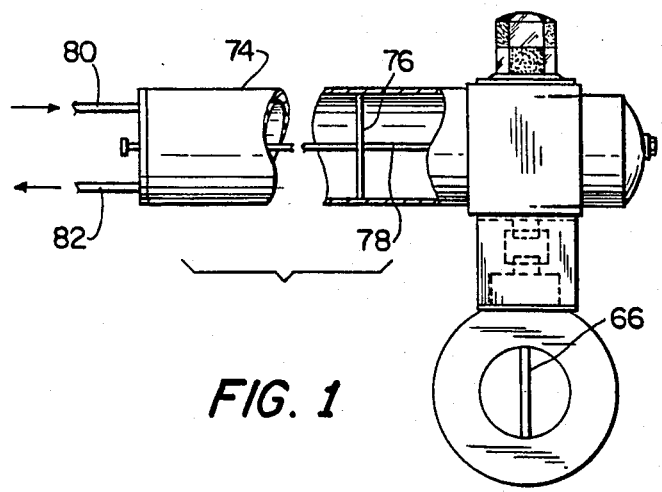
FIG. 1 is an elevational view, partially cut away, of the indicator assembly of the present invention mounted on a fluid handling apparatus.

Referring now to the drawing, there is illustrated an indicator assembly of the present invention, generally indicated as 10, mounted on an actuator assembly associated with and driving a valve assembly, generally indicated as 12 and 14, respectively.

Figure 3:
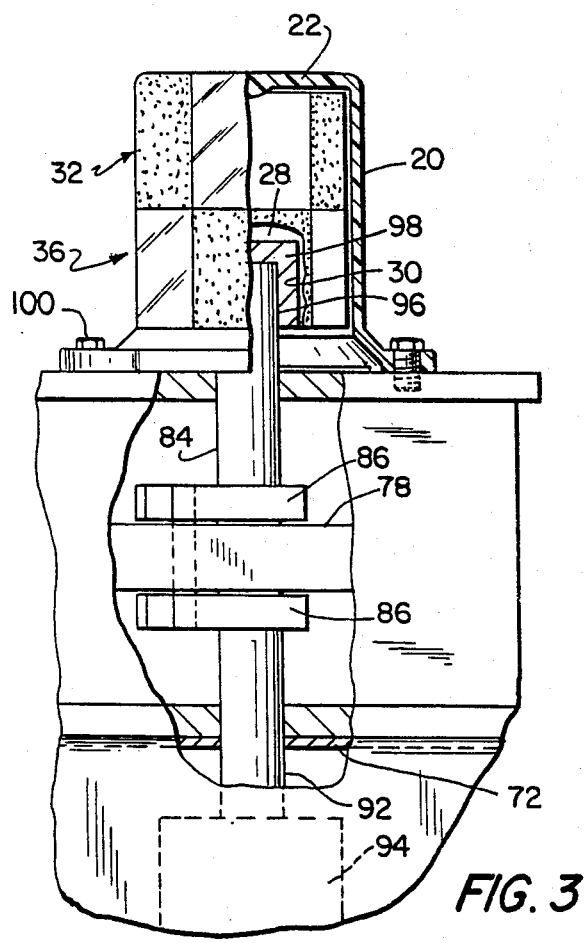
FIG. 3 is an enlarged partial cross-sectional view of the indicator assembly of the present invention.
Figure 4:
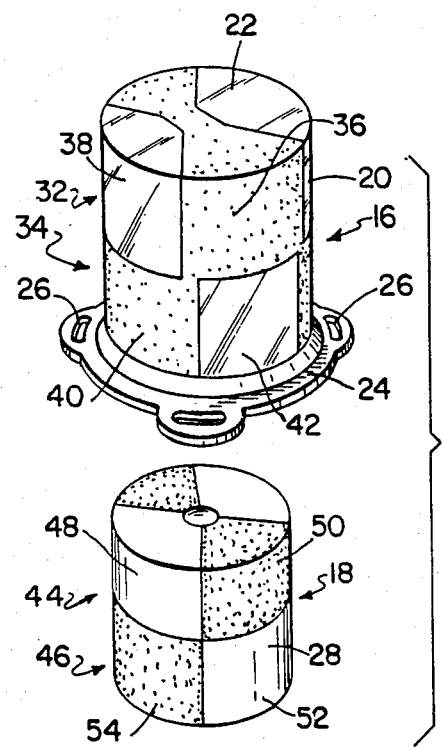
FIG. 4 is an exploded view of the major components of the indicator assembly of the present invention.

The indicator assembly 10 is comprised of a cylindrically-shaped housing member in which disposed for rotation there is positioned a cylindrically-shaped indicator member, generally indicated as 16 and 18, respectively, referring particularly to FIG. 4. The cylindrically-shaped housing member 16 is formed by a cylindrically-shaped side wall 20 enclosed by a top end wall 22 and including a disc-shaped outwardly-extending mounting ring member 24 including mounting orifices or holes 26 formed opposite the top end wall 22 thereof. The cylindrically-shaped indicator member 18 is formed of a cylindrically-shaped solid body member 28 including a rectangularly-shaped chamber 30 in an end portion thereof, more clearly shown in FIG. 3.

The indicator assembly 10 of the present invention may be formed of any suitable material given the prerequisite visual characteristics and conditions to which the indicator assembly 10 may be subjected during use. Generally, the housing member 16 and indicator member 18 of the indicator assembly 10 are formed of a thermoplastic material, such as plexiglass, polycarbonates or the like; materials exhibiting resistance to high temperatures and excellent mechanical and chemical properties. Preferably, the housing member 16 is formed of transparent or translucent thermoplastic material for visual acuity, as will become apparant to one skilled in the art.

As herein above mentioned, the respective parts of the indicator assembly 10 are provided with selectively-deposited layers of a paint or pigment material, decal or the like, referring more particularly to FIG. 4. Selective deposition of the paint or pigment material, is preferably coated on the interior surface of the side wall 20 of the housing member 16 divided into an hemicylindrically-shaped upper portion and a hemicylindrically-shaped lower portion, generally indicated as 32 and 34, respectively, however, processing limitations may require coating on the exterior surface thereof. The paint or pigment material in the upper portion 32 is deposited about opposed radial surface portion 36 of the inner surface of the side wall 20 thereby leaving the remaining opposed surface 38 transparent, with the paint or pigment material in the hemicylindrically-shaped lower portion 34 being deposited about opposed radial surface portions 40 of the interior surface of the wall 20 thereby leaving the remaining opposed surface portions 42 transparent. The opposed radial surface portions 36 and 40 cover a radial slightly greater than 90° thereby leaving the transparent radial portion 38 and 42 of a radial surface slightly less than 90° as will be more fully hereafter understood. A plane (not shown) coaxially-disposed to the axis of the housing member 16 through a midpoint of each radial surface portions 36 of the hemicylindrically-shaped upper portion 32 is perpendicularly disposed to a plane (not shown) coaxially-disposed to the axis of the housing member 16 through a midpoint of each radial surface portion 40 of the hemispherically-shaped lower portion 34 of the housing member 16.

The indicator member 16 is divided for selective deposition of a paint or pigment material decal or the like into a hemicylindrically-shaped upper portion and a hemicylindrically-shaped lower portion, generally indicated as 44 and 46, respectively, with the upper and lower portions 44 and 46 being further divided in opposed 90° radial surface sections 48 and 50, and 52 and 54, respectively, referring specifically to FIG. 4. A plane (not shown) coaxially-disposed to the axis of the indicator member 18 through a midpoint of the opposed radial surfaces sections 48 is perpendicularly-disposed to a plane (not shown) coaxially disposed to the axis of the indicator member 18 through a midpoint of the opposed radial surfaces section 50, as is a plane (not shown) coaxially disposed to the axis of the indicator member 18 through a midpoint of the opposed radial surface section 52 to a plane (not shown) coaxially disposed to the axis of the indicator member 18 of the opposed radial surface sections 54. The plane of the opposed radial surfaces sections 48 and the plane of the opposed radial surface section 54 are coplanar as are the plane of the opposed radial surface sections 50 and the plane of the opposed radial surface sections 54 of the upper and lower hemicylindrically-shaped portions 44 and 46, respectively.

Any color of paints or pigment material, decal or the like may be used. In his context, the color coding may reflex reference to the Ansi Standard for piping system, e.g. yellow-hazardous; green-liquid material slightly hazardous; blue-gaseous material slightly hazardous; and red-fire quenching. In the present invention a desired color of paint, for example yellow, is applied to the side wall 20 about surface portions 36 and 40 of the housing member 16. With a predetermined color configuration being selected for the fluid handling apparatus to which the present invention is to be mounted, e.g., all yellow to indicate a closed valve configuration and checkerboard to indicate an opened valve configuration, the required paint or pigment material is applied to the indicator member 18 to the opposed radial surface sections 48 and 52, i.e. yellow with a contrasting color of paint or pigment material, e.g. black being applied to the radial surface sections 50 and 54.

Figure 2:
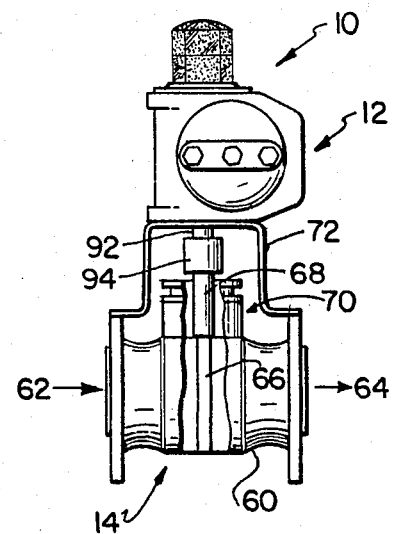
FIG. 2 is a side view, partially cut away, of the indicator assembly of FIG. 1.

As illustrated in FIGS. 1 to 3, the indicator assembly of the present invention is to be associated with a valve assembly 14 under the control of a pneumatic actuator assembly 12. The valve assembly 14 is comprised of a valve housing 60 including inlet and outlet ends, 62 and 64, respectively, a valve disk 66 and a valve spindle 68 for mounting the valve disk 66. The valve housing 60 is formed with a valve spindle packing assembly, generally indicated as 70, to permit rotation of the valve spindle 68 underfluid tight conditions.

On the valve assembly 60, there is provided a bracket 72 for mounting the actuator assembly 12. The actuator assembly 12 is comprised of a cylinder housing 74 and a piston 76 mounted for reciprocal movement therein by a cylinder rod 78, and is provided with a fluid inlet line 80 and fluid outlet line 82. The cylindrical housing 74 of the actuator assembly 12 is provided with a valve rod 84, referring to FIG. 3, at an end portion thereof extending through the side wall of the cylinder housing 74 positioned for rotation about 90° in bearing members (not shown) on an axis generally perpendicular to the axis of the cylinder rod 78. Arm members 86 are mounted on the valve rod 84 above and below the cylinder rod 78 and are connected to the cylindrical rod 78 by a pin member 88 disposed in a shaft 90 formed in the cylinder rod 78. A portion 92 of the valve rod 84 of the actuate assembly 12 extending downwardly through the cylinder housing 74 is mounted by a connecting element 94 to the valve spindle 68, as more clearly illustrated in FIG. 2. A portion 96 of the valve rod 84 of the actuator assembly 12 extending upwardly through the cylinder housing 74 is flattened for use as the means for connecting the indicator member 18 of the indicator assembly 10 to the pneumatic actuator assembly 12.

Referring now to FIG. 3, on the valve rod 84, there is provided a rectangular U-shaped member 98 disposed on the flatted portion 96 of valve rod 84 whereby the U-shaped member 98 is caused to rotate with rotation of the valve spindle 66 via the connecting element 92 and valve rod 84. Over the member 98, there is positioned the indicator member 18 of the indicator assembly 10, such that the the member 98 is disposed within the rectangularly-shaped chamber 30 of the indicator member 18. In FIG. 1, the valve disk 66 of the valve assembly 14 is disposed in an opened position within the valve housing 60. The indicator housing 16 is thereafter mounted, such as by screws 100, to the activator assembly 12 in a manner such that the radial surface sections 50 and 54 of the indicator member 18 are fully visible through the transparent or translucent portions 38 and 42 of the indicator housing assembly 12, as more closely illustrated in FIG. 1, to provide a checker-board visual representation of the positioning of the valve spindle 68 and thus the valve disk 66; i.e. the valve assembly 14 being in an opened mode.

In operation, referring now to FIGS. 1 and 3, the valve disk 66 and thus valve spindle 68 of the valve housing 60 being in an open position thereby permits a flow of fluid through the valve housing 60 from the inlet 62 to the outlet 64. In such operational position, the color of the paint of the radial surface sections 50 and 54 of the indicator member 18 (a color visually and significantly different from the color of the paint on the radial surface section 48 and 52 thereof), is visually observed through the transparent radial portions 38 and 42 of the housing member 16 thereby illustrating a checkerboard configuration indicative of an opened processing mode of the valve assembly 14.

By placing the inlet conduit 80 of the actuator assembly 12 in fluid communication with the downstream side of the compressor (not shown), places the chamber portion of the actuator cylinder 74 in fluid communication therewith to cause the cylinder piston 76 to be displaced to the right and thus the piston rod 78 to thereby cause rotation of the valve rod 84 through 90° by rotation of the arm member 86. Rotation of the valve rod 84 correspondingly rotates through 90° the valve disk 66 via the valve spindle 68 and connecting element 94 with concomitant counterclockwise rotation through 90° of the indicator member 18 to thereby align the radial surface sections 48 and 52 thereof with the transparent radial portions 38 and 42 of the housing member 16 thereby to visually indicate, by essentially a one-color display, the representation that the valve disk 66 of the valve assembly 14 is in a position to prevent fluid flow through the valve assembly 14, as illustrated in FIG. 2 i.e. closed.

While the present invention has been described with reference to a two way valve, it is understood by one skilled in the art that the present invention may be used in other valve assemblies, e.g. a three way valve.

While the invention has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivilants thereof.

What is claimed:

1. An indicator assembly visual indicating operational setting of a fluid handling apparatus having a first operational position and a second operational position and provided with an operational member for placing said fluid handling apparatus in said operational positions, which comprises:
    an indicator member comprised of a first and second surface sections, said first surface section being provided with a first indicator means referenced to said first operational position and said second surface section being provided with a second indicator means referenced to said second operational position, said indicator member being connected to said operational member of said fluid handling apparatus; and
    a housing member including a translucent section and an indicator section mounted about said indicator member, said first surface section of said indicator member being visible through said translucent section when said operational member in said first operational position and said second surface section of said indicator member being visible through said translucent section when said operational member is in said second position, said indicator section of said housing member being provided with an indicator means to visually cooperate with one of said indicator means of said indicator member to indicate an operational position of said fluid handling apparatus.

2. The indicator assembly as defined in claim 1 wherein said indicator means are differing colors.

3. The indicator assembly as defined in claims 1 or 2 wherein said fluid handling apparatus is a valve having with the operational member rotating between said first and second operational positions corresponding to an open position and off position with respect to fluid flow, respectively.

4. The indicator assembly as defined in claim 3 wherein said first color of said first surface section corresponds to said first operational position and said second color of said second operational position and said housing member other than said transparent section is of a color corresponding to said second color.

5. The indicator assembly as defined in claim 3 wherein said indicator member is cylindrically-shaped and said housing member is formed with a cylindrically-shaped chamber for receiving said cylindrically-shaped indicator member.

6. The indicator assembly as defined in claim 3 wherein said first surface sections and said second surface sections of said indicator member are comprised of opposed radial surface portions of approximately 90° and wherein said translucent section is comprised of opposed radial surface portions of about 90°.

7. The indicator assembly as defined in claim 6 wherein said indicator member is divided into an upper and lower hemicylindrical portions with said first surface sections on said upper hemicylindrical portion being offset by 90° from said first surface sections on said lower hemicylindrical portion being and wherein said housing member is divided into an upper hemi-portion and a lower hemi-portion with said opposed transparent radial surfaces on said upper hemi-portion being offset by 90° from said opposed transparent radial surfaces on said lower hemi-position of said housing member.

8. The indicator assembly as defined by claim 1 wherein said indicator member is enclosed by said housing members.

9. A valve assembly which comprises:
    a valve housing;
    a valve spindle disposed in said valve housing;
    a valve disk mounted for rotation on said valve spindle between an opened and closed fluid flow position;
    an indicator member comprised of a first and second surface sections, connected to said valve spindle of said valve housing, said first surface section being provided with a first indicator means referenced to a first operational position of said valve disk and said second surface section being provided with a second indicator means referenced to a second operational position of said valve disk; and
    a housing member including a translucent section and an indicator section mounted about said indicator member, said first surface section of said indicator member being visible through said translucent when said valve spindle in said first operational position and said second surface section of said indicator member being visible through said translucent section when said valve spindle is in said second position, said indicator section of said housing member being provided with an indicator means to visually cooperate with one of said indicator means of said indicator member to indicate an operational position of said spindle.

10. The valve assembly as defined in claim 9 wherein said indicator means are differing colors.

11. The valve assembly as defined in claims 9 or 10 wherein said fluid handling first and second operational positions corresponding to an open position and off position of said valve assembly with respect to fluid flow, respectively.

12. The valve assembly as defined in claim 11 wherein said first color of said first surface section corresponds to said first operational position and said second color of said second operational position and said housing member other than said transparent section is of a color corresponding to said second color.

13. The valve assembly as defined in claim 11 wherein said indicator member is cylindrically-shaped and said housing member is formed with a cylindrically-shaped chamber for receiving said cylindrically-shaped indicator member.

14. The valve assembly as defined in claim 11 wherein said first surface sections and said second surface sections of said indicator member are comprised of opposed radial surface portions of approximately 90° and wherein said transluscent section is comprised of opposed radial surface portions of about 90°.

15. The valve assembly as defined in claim 11 wherein said indicator member is divided into an upper and lower hemicylindrical portions with said first surface sections on said lower hemicylindrical portion being and wherein said housing member is divided into an upper hemi-portion and a lower hemi-portion with said opposed transparent radial surfaces on said upper hemi-portion being offset by 90° from said opposed transparent radial surfaces on said lower hemi-position of said housing member.

16. The valve assembly as defined in claim 9 wherein said indicator member is enclosed said housing member.

* * * * *